Patented Sept. 6, 1949

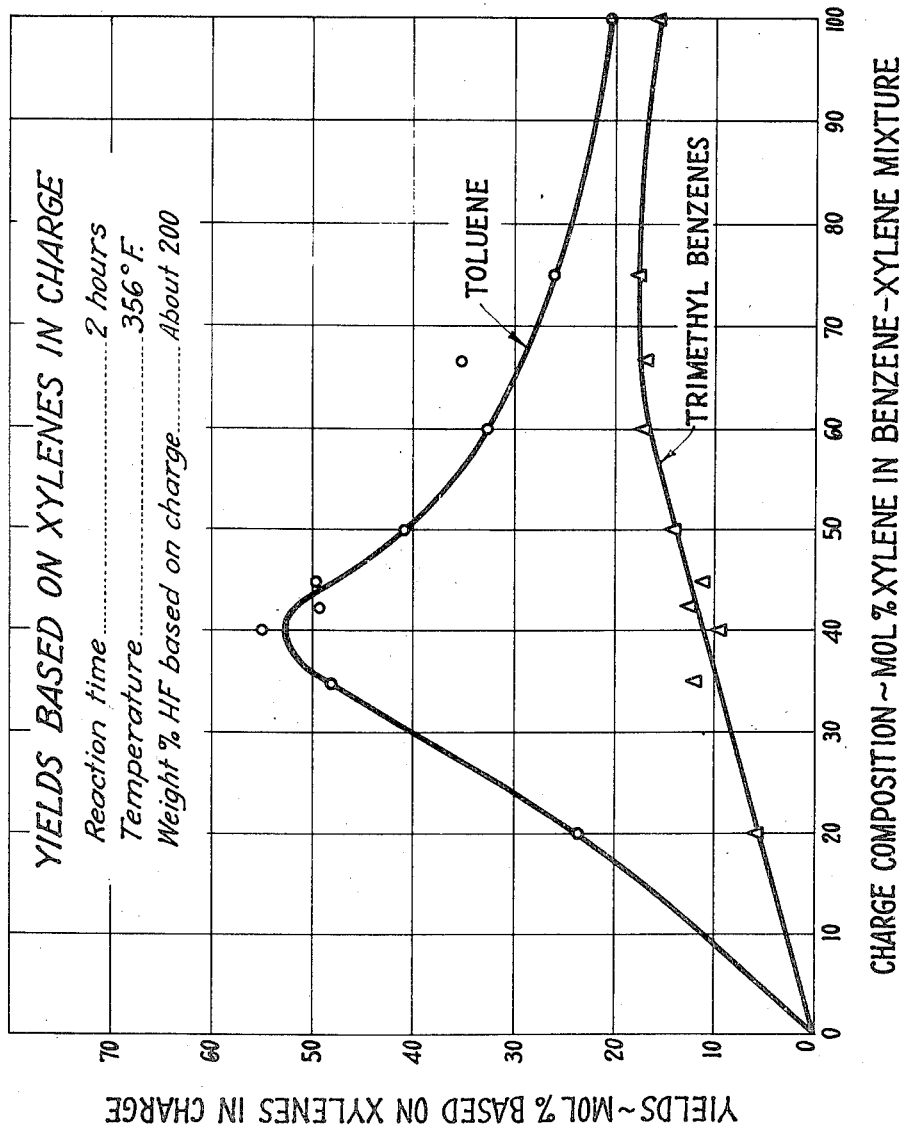

2,480,939

UNITED STATES PATENT OFFICE 2,480,939

XYLENE-BENZENE CONVERSION

Robert J. Lee, La Marque, Tex., and Herschel D. Radford, Columbia, Mo., assignors to Pan American Refining Corporation, Texas City, Tex., a corporation of Delaware Application January 22, 1947, Serial No. 723,648

3 Claims. (Cl. 260—672)

This invention relates to a process for the conversion of xylenes to toluene and is a continuation-in-part of our application for Letters Patent, Serial No. 480,912, filed on March 29, 1943, now U. S. Patent 2,416,184. In continuing our study of xylene conversion in the presence of a catalyst consisting essentially of anhydrous hydrogen fluoride, we have observed that when xylene-benzene mixtures are employed, the yield of toluene based on the xylene charge is related to the composition of the charging stock. More specifically, we have discovered that an unexpected and surprising increase in the yield of toluene based on xylenes charged is obtained over a relatively small range of xylene:benzene molar ratios, employing liquid hydrogen fluoride as a catalyst.

Accordingly, it is an object of our invention to provide a novel process for the conversion of mixtures of xylene and benzene to toluene in high yields. Another object is to subject mixtures of xylene and benzene containing amounts of xylene hereafter defined to the action of a hydrogen fluoride catalyst to produce a maximum yield of toluene based on the xylene charged.

A further object of our invention is to provide a process whereby maximum yields of toluene, based on xylenes charged, are obtained from mixtures of xylenes and benzene in the presence of a hydrogen fluoride catalyst by carefully controlling the ratio of xylene to benzene in said mixture.

Our invention comprises contacting mixtures containing between about 30 and about 50 mol per cent of a xylene and benzene with liquid hydrogen fluoride under conditions conducive to the transfer of methyl radicals from one xylene nucleus to nuclear carbon atoms in a benzene molecule or in another xylene molecule. The transfer of methyl radicals can usually be effected by agitating the charging stock with liquid hydrogen fluoride at temperatures between about 150° F. and about 450° F. under sufficient pressure to maintain the reactants in the liquid phase. Pressures of about 100 to about 2000 pounds per square inch are ordinarily employed, e. g., pressures between about 1000 and about 1500 pounds per square inch. After the reaction has proceeded to the desired extent, the reaction mixture is treated, e. g. by distillation or by cooling and stratifying, to separate the catalyst, which may be recycled to the conversion process with or without preliminary purification. The desired hydrocarbon products are then separated, e. g. by distillation, and unreacted feed stock and/or heavy ends may be recycled to the conversion process.

Although we prefer to use substantially anhydrous hydrogen fluoride as the catalyst, we have successfully employed aqueous solutions of hydrogen fluoride containing as much as 25 weight per cent of water. In general, water tends to reduce the catalytic activity of hydrogen fluoride and to produce corrosive solutions. We have found commercial anhydrous hydrogen fluoride to be a satisfactory catalyst; no special precautions were found necessary to protect liquefied commercial hydrogen fluoride from atmospheric moisture in our operations. Commercial hydrogen fluoride may contain about 0.5% water, the average being 0.1 to 0.2%. It may sometimes be desirable to employ co-catalysts with the hydrogen fluoride, e. g. minor amounts of $BF_3$.

In the conversion of xylene-benzene mixtures to toluene it is essential to use high catalyst-to-feed ratios. At least 100 weight per cent of hydrogen fluoride based on the total hydrocarbon charging stock should be employed. We have observed that the conversion of xylene-benzene mixtures to toluene increases markedly as the quantity of hydrogen fluoride catalyst is increased from about 100 to about 200 weight per cent, based on the total hydrocarbon charging stock. We prefer, therefore, to employ at least about 200 weight per cent of hydrogen fluoride catalyst based on the total weight of hydrocarbon charging stock in our process.

In converting a xylene-benzene mixture containing 45 mol per cent of xylenes at about 350° F. for two hours, we have observed only a slight increase in the toluene yield, based on the total hydrocarbon charge, when the quantity of HF catalyst was increased from about 200 weight per cent to about 300 weight per cent, based on the total hydrocarbon charge. The optimum quantity of HF to be used in the conversion of xylene-benzene mixtures to toluene seems, therefore, to be about 200 weight per cent based on the total hydrocarbon charged, although some variation from this figure may be necessitated in certain instances.

Although temperatures between about 150 and about 450° F. can be employed in our conversion process, we prefer to use temperatures above about 200° F., preferably temperatures in the range of about 300 to about 450° F.

In our conversion process, sufficient pressure is maintained on the reactants so that they are present, almost wholly, as a liquid phase in the reaction zone. The use of a liquid phase reaction system reduces pumping and storage costs, and facilitates the contacting of the reactants with the catalyst.

In order to facilitate homogeneous and rapid reaction and to reduce catalyst requirements, it is advantageous to agitate the catalyst and reactants vigorously. The agitation may be effected by any of the numerous well known means such as shaking, by the use of turbo mixers, orifice mixers, by pumping the reactants rapidly in a closed cycle, injecting inert gases into the liquid reaction system and the like. Agitation may likewise be effected by circuating the reaction mixture through baffled or packed towers or tubes containing chips or shavings of copper, chrome steels, nickel and the like.

Our invention may be operated as a continuous, semi-continuous or batch process. These methods of carrying out conversion processes are well known in the art and need not be described in detail here. The process may be effected in autoclaves, high pressure bubble towers, or continuous tubular reactors. The conversion process may be effected on a recycling basis or in a number of interconnected stages.

The xylene and benzene reactants can be charged to the conversion equipment in a variety of ways. Thus, one or more of the hydrocarbon feeds may be dissolved in, or mixed with, liquid hydrogen fluoride and charged to the conversion equipment, or the reactants and catalyst may be separately charged, or one reactant may be charged into a body of liquid hydrogen fluoride and another hydrocarbon reactant.

Upon completion of the desired conversion, the hydrogen fluoride may be separated from the hydrocarbon reactants and reaction products by distillation, stratification, or extraction processes. In general, we have found it expedient to separate the hydrogen fluoride by stratification and to reuse it in our conversion process. In another method of operating, we may add ice, water, caustic, aqueous sodium carbonate, alcohols, ammonia and the like to the reaction mixture in order to remove the hydrogen fluoride.

After separation of the hydrogen fluoride, the hydrocarbons present in the reaction mixture may be fractionated to separate the desired product or products and unreacted hydrocarbons or by-products which may be recycled to the conversion process.

The conversion equipment may be made of or lined with copper, steel, stainless steel, Monel metal, nickel or platinum. When iron vessels are used, tarry residues are formed that are absent when copper vessels are used for the same reaction.

Our invention will be better understood by reference to the following table and the appended figure. The experimental technique employed in obtaining the tabulated data was as follows:

The catalyst employed was commercial anhydrous hydrogen fluoride. No extreme precautions were taken to exclude the possible absorption of moisture by the hydrogen fluoride although any such absorption was probably slight since the transfer operations in most cases were carried out in closed systems. The xylenes and benzene were Baker's chemically pure material meeting the American Chemical Society standards. Efficient fractionation data and ultraviolet spectrophotometric analyses of the xylenes charged to the conversion process indicated the following composition:

| | Weight per cent |
|---|---|
| p-Xylene | 21–23 |
| m-Xylene | 40–44 |
| o-Xylene | 15–18 |
| Ethylbenzene | 10–13 |

The aromatic content, as determined by the silver sulfate catalyzed sulfonation procedure, was found to be 95.6 weight per cent.

The experiments were conducted in either an alloy steel or an illium bomb. The majority of these experiments were performed in the illium bomb, in which the total volume of catalyst and hydrocarbon initially charged was approximately 65% of the actual capacity (739 ml.) of the bomb. The charge volume was adjusted so that thermal expansion of the reactants would just fill the bomb at reaction temperature. This was done so that the vapor space would be negligible; hence the actual catalyst concentration in the liquid-phase reactants would be equivalent to the amount of hydrogen fluoride charged. Because of the desirability of adhering to this technique, the actual reaction pressure was moderately in excess of the normal vapor pressure of the system in some cases. This, of course, resulted from the development of hydrostatic pressure after the reactor contents had expanded to fill the allowable space. The system was equipped with a blow-out relief assembly to protect against excessively high pressures. During reaction the bomb was secured in an electrically heated jacket of a conventional design and the bomb was rocked through an angle of approximately 30° above and 30° below horizontal at the rate of about 58 times per minute.

At the end of each run the reaction bomb was cooled and the mixture of hydrocarbon and hydrogen fluoride was displaced through a delivery tube extending from the bottom of the bomb to a point near the bottom of a neutralizing mixture composed of cracked ice and ammonia. The rate of delivery was held at a low value to allow the heat evolved on neutralization of the hydrogen fluoride to be quickly dissipated so that a low temperature (ca. 32° F.) could be maintained throughout the neutralization. Accordingly, the loss of hydrocarbon by volatilization was negligible, particularly since the greater part of the hydrogen fluoride was neutralized before any appreciable quantity of hydrocarbon (upper phase) was displaced from the bomb. There was no determinable tar formation in the majority of these experiments. The reaction pressures were substantially constant during any given run and essentially no gas was observed in the products. Therefore, apparently, the only loss of hydrocarbon was a small mechanical one, resulting from the relatively large volume of cracked ice and aqueous ammonia employed to scrub the hydrocarbon product and to absorb and neutralize the hydrogen fluoride. Even this loss was greatly reduced in many of the later experiments by rinsing the bomb with isopentane and by extracting the aqueous layer from the neutralization of the reactants with isopentane. The isopentane was subsequently removed from the hydrocarbon product by careful fractionation. By employing this technique, product recoveries as high as 97% have been obtainable. Consequently it is justifiable to express the product yields on a 100% recovery basis in these experiments. The tabulated data, therefore, are calculated on this basis for all of the experiments, except some individual cases (noted in the table) where a small amount of tar was formed. In these instances, the product yield is based on the per cent hydrocarbon actually recovered. In these cases, also, mechanical losses are necessarily also disregarded and the yields reported are, therefore, undoubtedly lower than the true yield.

The composition of the hydrocarbon product was determined by precise fractional distillation through a Podbielniak high-temperature super-fractionating column containing a 36" Heli-Grid packing. The (197.6–248.0° F.) fraction, substantially all of which boiled at 230–231.8° F., was taken as toluene. Refractive index measurements for the toluene fraction ($n_D^{20}$; 1.4932–1.4950) and sulfonation data confirm the high aromaticity of this fraction. The identity of the toluene product was verified by oxidation to benzoic acid. The benzene, xylene and trimethylbenzene fractions showed similar high refractive indices and aromatic contents. Normally, during these distillations, very little distillate was obtained between the boiling points of the respective aromatics. A high boiling hydrocarbon which had been carefully prefractionated to remove any constituents boiling below 392° F. was added to the hydrocarbon product before distillation to permit complete recovery by distillation of the trimethylbenzenes. The trimethylbenzenes fraction was considered to be that material fractionated in the 320–347° F. range. The trimethyl-benzenes were characterized by refractive index and boiling point. By careful fractionation of a composite of the trimethyl-benzenes fraction from several runs, it was found that pseudocumene (1,2,4 trimethyl-benzene), boiling 336.2–338° F., was the predominant isomer.

The group of experiments whose results are described in the table were carried out under substantially constant operating conditions to determine the effect on toluene and trimethyl-benzene yields resulting from the addition of varying amounts of benzene with the xylene charging stock.

In this series of runs, the mol per cent xylene in the hydrocarbon charge was varied from 100% xylenes to 20% xylenes with the remainder being benzene. All of these experiments were performed at a temperature of 356° F. with approximately 200% by weight of hydrogen fluoride based on total hydrocarbons charged. Run 10, in which xylenes alone were charged, shows the production of approximately 20 mol per cent toluene under these conditions. Simultaneously recovered were more highly alkylated benzenes. As the mol per cent xylene in the benzene-xylene charge was reduced, the toluene yield calculated as per cent of the total hydrocarbon charge remained substantially constant down to about 40% xylene in the charge. Thereafter it fell off sharply with lower concentrations of xylene in the charge mixture.

The data obtained in the above group of experiments have been recalculated to determine the yield of toluene based on xylenes present in the charge and these results are shown in the table and graphically in the appended figure. It is very striking in examining the figure that the yield of toluene based on xylenes in the charge increases rapidly to a pronounced maximum as the mol per cent xylenes in the charge is increased or decreased to approximately the 40% level. Thereafter this curve also shows a reduction in toluene yield. As the figure indicates, maximum toluene yields based on xylenes charged are obtained when the charge contains between about 30 and about 50 mol per cent of xylenes. Even more preferable is the use of charging stocks containing between about 35 and about 45 mol per cent of xylenes in benzene.

The figure carries a second curve showing the yield of aromatic hydrocarbons in the trimethyl-benzene range (320–347° F.). It is evident that throughout the composition range studied, decreasing xylene concentration in the charge causes either no change in trimethyl-benzene yield based on xylene charged or a reduction in trimethyl-benzene. The reduction in yield is definitely apparent as xylene concentrations fall below about 65 mol per cent; i. e., as benzene concentration is increased. This behavior is exactly the opposite of that shown by the toluene yield. A marked reduction in the yield of trimethyl-benzenes, based on xylenes charged, is evident in the range of 30 to 50 mol per cent xylenes in benzene.

If only disproportionation of xylene were oc-

TABLE

*Conversion of xylenes to toluene, benzene and polymethylated-aromatics with anhydrous hydrogen fluoride*

[Mol per cent xylenes in charge as a variable]

| Run No. | Charge Stock Mol Per Cent Xylenes in Xylene-Benzene Mixture | Average Reaction Temp., °F. | Approx. Pressure, p. s. i. a. | Wt. Per Cent HF [d] | Reaction Time, Hrs. | Mol Per Cent Yield of Products Based on Total Charge Stock [b] | | | | Mol Per Cent Higher Methyl Benzenes and Distillation Loss | Toluene Yield, Mol Per Cent on Xylenes Charged | Approx. Tar Yield, Wt. Per Cent |
|---|---|---|---|---|---|---|---|---|---|---|---|---|
| | | | | | | Benzene | Toluene | Xylenes | Trimethyl-benzenes | | | |
| 1 | 20 | 356 | 1,450 | 200 | 2 | 76.3 | 4.8 | 15.4 | 1.2 | 2.3 | 24 | none |
| 2 | 35 | 356 | 1,500 | 200 | 2 | 56.6 | 16.9 | 18.6 | 4.1 | 3.8 | 48.25 | trace |
| 3[a] | 40 | 356 | 1,650 | 200 | 2 | 42.7 | 22.0 | 19.4 | 3.8 | 11.1 | 55 | 1 |
| 4[a] | 42.5 | 356 | 1,125 | 200 | 2 | 47.3 | 21.0 | 21.2 | 5.2 | 4.3 | 49.4 | 1 |
| 5[a] | 45 | 356 | 1,550 | 192 | 2 | 38.9 | 22.4 | 19.9 | 5.0 | 12.8 | 49.75 | 1 |
| 6 | 50 | 356 | 1,100 | 215 | 2 | 37.9 | 20.6 | 26.1 | 7.1 | 8.3 | 41.2 | none |
| 7 | 60 | 356 | | 200 | 2 | 30.3 | 19.8 | 31.9 | 10.3 | 7.7 | 33 | none |
| 8 | 66.7 | 356 | 950 | 208 | 2 | 21.6 | 23.4 | 35.1 | 11.4 | 8.5 | 35 | none |
| 9 | 75 | 356 | 850 | 197 | 2 | 16.4 | 19.8 | 35.8 | (c) | (c) | 26.4 | none |
| 10 | 100 | 356 | 1,100 | 200 | 2 | 3.1 | 20.7 | 31.1 | 15.9 | 29.2 | 20.7 | none |

[a] Due to the formation of tar in these reactions the yields of aromatic hydrocarbons are based on actual recovery.
[b] Calculated to 100% liquid recovery assuming no loss of hydrocarbon in the experiment except distillation losses (unless designated otherwise—see footnote ([a])).
[c] Trimethyl-benzenes plus higher methylbenzenes plus distillation loss amount to 28.0 mol %.
[d] Based on total hydrocarbons charged.

curring in the reaction it would be expected that toluene and trimethylbenzene yields would show roughly parallel behavior. In xylene disproportionation, products other than toluene and trimethyl-benzenes are formed (e. g. benzene and more highly methylated benzenes). However, toluene and trimethyl-benzenes represent primary products of xylene disproportionation and it would be expected that as toluene yield increases there should be an increase in trimethyl-benzene yield. If on the other hand, the benzene in the reaction mixture were to take part in the reaction and itself be methylated then one should get increased toluene yields accompanied by decreased yields of trimethyl-benzenes and the more highly alkylated benzenes. It can only be concluded, therefore, that when mixtures of benzene and xylene are charged to the reaction some methylation of benzene occurs.

Having thus described our invention, what we claim is:

We claim:

1. The process which comprises contacting a mixture of a xylene and benzene containing between 35 and 45 mol percent of xylene with at least about 200 weight percent of a catalyst consisting essentially of hydrogen fluoride at a temperature between about 300° F. and about 450° F. under sufficient pressure to maintain the liquid phase for a reaction period sufficient to produce a substantial amount of toluene, and recovering toluene from the reaction mixture.

2. The process of claim 1 wherein the amount of hydrogen fluoride is about 200 percent by weight of the mixture of xylene and benzene employed as the charging stock.

3. The process of claim 1 wherein the amount of hydrogen fluoride is about 200 percent by weight of the mixture of xylene and benzene employed as the charging stock and the reaction temperature is about 360° F.

ROBERT J. LEE.
HERSCHEL D. RADFORD.

REFERENCES CITED

The following references are of record in the file of this patent:

UNITED STATES PATENTS

| Number | Name | Date |
|---|---|---|
| 2,416,184 | Lee et al. | Feb. 18, 1947 |